July 28, 1953    G. R. ERICSON    2,646,960
ROTARY PLUG WITH SEALING SLEEVE
Filed Jan. 12, 1949    2 Sheets-Sheet 1
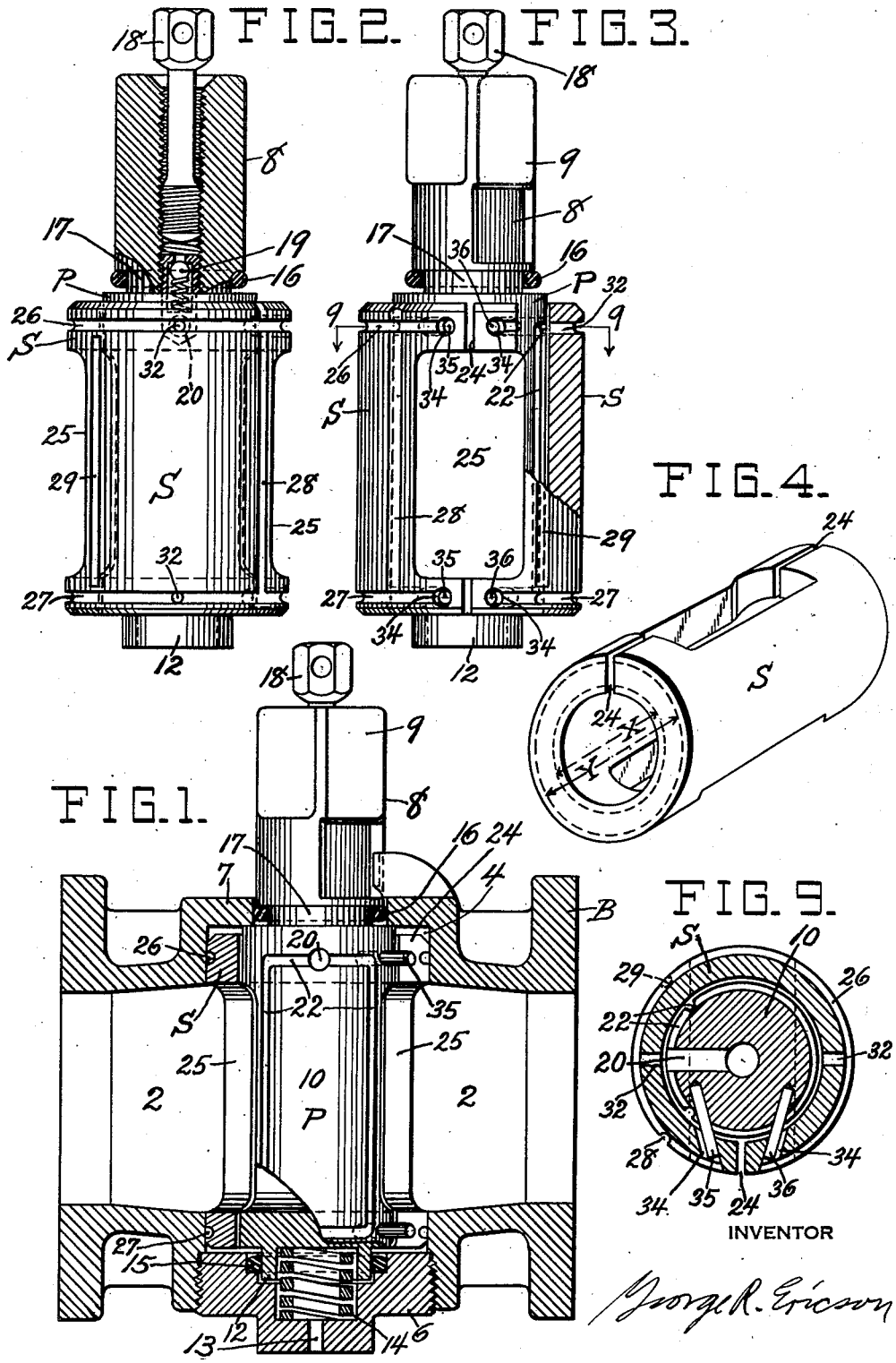
INVENTOR
George R. Ericson July 28, 1953 G. R. ERICSON 2,646,960
ROTARY PLUG WITH SEALING SLEEVE
Filed Jan. 12, 1949 2 Sheets-Sheet 2

INVENTOR
George R. Ericson

Patented July 28, 1953

2,646,960

UNITED STATES PATENT OFFICE 2,646,960

ROTARY PLUG WITH SEALING SLEEVE

George R. Ericson, Kirkwood, Mo., assignor to American Car and Foundry Company, New York, N. Y., a corporation of New Jersey Application January 12, 1949, Serial No. 70,423

3 Claims. (Cl. 251—102)

This invention relates to valves in general and particularly to valves of the lubricated plug type.

Valves of the plug cylindrical type necessarily must have clearance between the plug and body so that the plug may turn in the body and be readily assembled. Since it has been necessary to provide clearance between the plug and body it has been customary to use a so-called lubricant or sealing compound which can be forced into the clearance and smeared over the surface of the plug and body to prevent leakage of the line material. So far no single lubricant has been found which will withstand all types of ladings passing through the valve, nor which will withstand wide ranges of temperatures. Accordingly, the valves have had to be supplied with different types of lubricants for different ladings and temperatures and, in cases where the valves were improperly used, serious leakages have occurred. It is an object, therefore, of the present invention to provide a valve of the lubricated type so constructed and arranged that leakage is reduced to a minimum even in cases where lubricant has entirely disappeared from the valve.

A further object of the invention is the provision of a valve of the lubricated type which is inherently self-sealing.

A still further object of the invention is the provision of a lubricated valve of the plug type in which there is substantially zero clearance between the body bore and plug.

A yet further object of the invention is the provision of a new and improved method of constructing valves having substantially zero clearance between the moving parts.

These and other objects of the invention will be apparent to persons skilled in the art from a study of the following description and accompanying drawings, in which Fig. 1 is a sectional view of the improved valve with parts broken away to better disclose the construction;

Fig. 2 is an elevational view of the improved plug element having parts broken away to better disclose the construction;

Fig. 3 is an elevational view similar to Fig. 2 but with the plug element turned ninety degrees;

Fig. 4 is a perspective view of the rough sleeve element forming part of the plug member;

Fig. 9 is a sectional view taken substantially on line 9—9 of Fig. 3.

Figure 5:
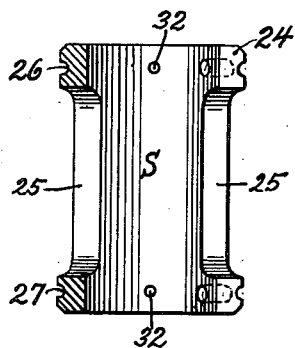
Fig. 5 is a sectional view of the finished sleeve element.

Referring now to the drawings in detail it will be seen that the improved valve is made up of three main parts, namely, the body B and the two-part plug which is formed with the plug portion P and the sleeve element S. The body B, as clearly shown, is preferably formed from a casting having a passage 2 extending therethrough for the passage of lading and which passage is intersected by a transverse cylindrical bore 4. The cylindrical bore is closed at one end by a cap 6, preferably screwed into the body and is partially closed at the other end by overhanging shoulders 7 which have an opening therein for passage of the plug stem.

The plug P is formed with a stem 8 having a wrench receiving portion 9 and integrally connected with a cylindrical central portion 10 located in the body bore and terminating in a cylindrical extension 12. The cylindrical extension 12 is preferably hollow to receive a spring 14 bearing against the plug and against the cap 6. The outer surface of the cylindrical extension 12 is carefully machined to receive a resilient ring 15 of circular cross-section located in a recess formed in cap 6. This resilient ring will effectively prevent any leakage past the extension 12 and will permit the cap 6 to have a balancing opening 13 drilled therein. In the present valve as disclosed the spring 14 will urge the top surface of the plug into engagement with the shoulders 7, but where desired this spring may be eliminated and the plug held in proper position by close engagement between the cap 6 and the lower end of the plug, thus preventing excessive longitudinal shifting of the plug within the bore. In order to prevent leakage of line material or lading past the shoulders 7 a resilient ring 16 of circular cross-section closely engages the opening and shoulders 7 and is located in a groove 17 formed in the stem portion of the plug P; thus it will be seen that the plug is held in proper position within the body bore and leakage past the ends of the plug is prevented by the sealing rings 15 and 16. As clearly shown, the stem of the plug is threaded to receive a ram 18 by means of which lubricant or sealing compound may be forced into the valve. Back flow of lubricant is prevented by means of a ball check 19 secured in the stem, which ball check will permit inward passage of lubricant or sealing compound under pressure exerted by the ram 18. Lubricant or sealing compound passing the ball check under pressure can flow horizontally outward through passages 20 extending through the plug and having their ends intersecting a rectangular groove system 22 cut or otherwise formed in the cylindrical surface of the central portion 10 of the plug.

The plug element just described does not occupy the complete bore and can not of itself prevent passage of lading through the valve passages 2. In order to complete the plug and block passage of lading when desired, the sleeve S is provided. This sleeve in its finished form is formed with an inside diameter but slightly larger than the cylindrical portion 10 of the plug, while its outside diameter is substantially identical to the inside diameter of the body bore. As clearly shown in Figs. 1, 2, 3 and 5, the finished sleeve is slotted on one side as at 24, said slot being preferably located centrally of one opening 25 extending transversely through the sleeve and lining up with a similar opening in the plug, which openings 25 will in turn line up with passages 2 of the body when the valve is in open position. In order to lubricate the bearing surfaces between the sleeve and body bore discontinuous top and bottom circumferential grooves 26 and 27 are formed and joined by full length longitudinal grooves 28 located to one side of the opening 25 and which groove will never be exposed to the lading passing through the valve. On the other side of the passage 25 longitudinal grooves 29 are formed which do not connect with the discontinuous circumferential grooves but can be connected with such circumferential grooves through the medium of dwarf grooves or pockets formed in the body in such position that lubricant can be forced into grooves 29 only when the valve is in either full open or full closed position. Lubricant or sealing compound can be supplied to the sleeve groove system by means of passages 32 drilled through the sleeve and adapted to line up with passages 20 drilled or otherwise formed in the plug. Thus it will be seen that lubricant may be forced under pressure into a groove system formed on the outer surface of the sleeve and also into a rectangular groove system 22 formed on the outer surface of the central plug portion. The groove system on the sleeve will lubricate and effectively seal and lubricate the relatively moving surfaces of sleeve and bore while the lubricant system 22 will serve to seal the space between the plug member and sleeve and will also exert pressure tending to tightly engage the sleeve with the valve body.

In order that the sleeve may be driven by the plug member, holes 34 are drilled or otherwise formed in the upper and lower portions of the sleeve adjacent the slot 24. A plurality of pins 35 and 36 extend through these holes and into the plug member as clearly shown in Figs. 1, 3 and 9. As best shown in Fig. 9 the pins 35 and 36 are of smaller diameter than the holes 34 and the pins 35 are located to the left of the slot 24 and the pins 36 to the right of the slot. These pins may extend radially into the central portion of the plug or, as shown in Fig. 9, they may be inclined so as to exert an inward force on the leading edge of the sleeve during turning of the plug. Referring particularly to Fig. 9 it will be seen that as the plug is turned in a clockwise direction the pins 36 will bear on the edge of hole 34 and, due to the inclined relation of the pin, will exert a pressure such that the leading edge of the sleeve will tend to move inwardly toward the central portion 10 of the plug. Also, since the plug sleeve is in engagement with the body bore, friction will be present and pressure applied through pins 36 will tend to close the slot 24, thus decreasing the outside diameter of the sleeve and providing clearance between the sleeve and bore sufficient to permit turning. In other words, the sleeve S will tend to wrap on the plug during turning to the end that clearance is provided permitting such turning.

Figure 6:
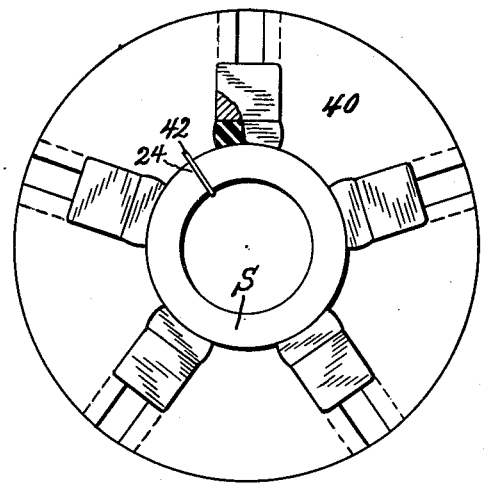
Fig. 6 is an elevational view disclosing one method of gripping the rough sleeve element.
Figure 7:
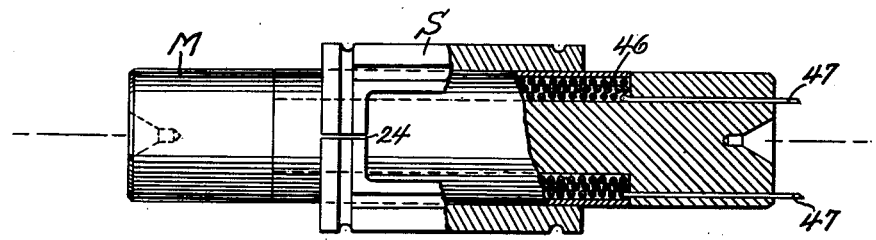
Fig. 7 is an elevational view with parts broken away and disclosing a method of gripping the sleeve element for finishing.
Figure 8:
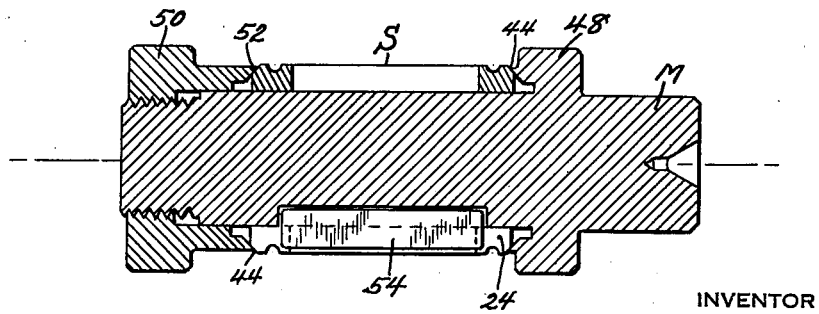
Fig. 8 is a sectional view of a still further method of gripping the sleeve element for finishing.

The wrapping action of the sleeve on the plug and the construction of the sleeve in the manner now to be described permit the assembly of the valve with zero clearance existing between the sleeve and body bore yet providing a valve which can be turned and which will normally prevent leakage even where lubricant has escaped from the valve. In forming the sleeve a rough casting, die pressing or rolled member is formed as shown in Fig. 4. However, in some instances it may be desirable to form the rough member without the slot 24 therein, which slot will be later cut in the sleeve. In the form shown, however, the rough casting or otherwise formed sleeve is placed in a lathe chuck 40 (Fig. 6) with the jaws of the chuck preferably having their faces covered with resilient material, such as rubber, having a relatively high durometer hardness. Prior to gripping the rough sleeve in the chuck jaws a spacer 42 is placed in the slot 24. After the chuck jaws have firmly gripped the sleeve, squeezing the same onto the spacer 42, the inside diameter will be carefully bored to a diameter such as X (Fig. 4), which diameter is but slightly greater than the diameter of the plug portion 10. For example, if the finished inside diameter X of the sleeve is 2.00 inches and the slot 24 is intended to be one-sixteenth of an inch, then the diameter of the plug portion 10 should be approximately two one-hundredths of an inch smaller. While the rough sleeve is having its internal diameter turned to dimension X, the rough groove system can be cut in the external surface and the ends finished. In cases where the fixture of Fig. 8 is to be used, then the edges will be beveled as at 44, which bevel will in the finished product assist in assembly of the valve plug in the body. Following the finishing of the interior surface, the sleeve will be slipped onto a mandrel M, such as the magnetic type of Fig. 7. As shown in Fig. 7 the mandrel is of the electro-magnetic type having windings 46 supplied by current through lead wires 47. When the windings are energized the sleeve will be tightly engaged on the mandrel which has an exterior diameter equal to the internal diameter X of the finished sleeve. In the form of mandrel shown in Fig. 8 a collar 48 is provided on the mandrel and having an inclined surface adapted to engage one bevel 44 of the sleeve. The opposite end of the mandrel is threaded to receive a nut like member 50 also having an inclined surface 52 adapted to engage the other inclined surface 44 of the sleeve. By jamming the nut 50 toward the shoulder 48, the beveled surfaces will coact to tighten the sleeve onto the mandrel M, which will have a central portion with a diameter substantially equal to the diameter X of the finished sleeve. In order to maintain the proper inside diameter X of the sleeve a spacer 54 is inserted in slot 24 prior to tightening the nut 50 and this spacer 54 is of identically the same thickness as the spacer 42 previously referred to in connection with Fig. 6 and used during the turning of the inside of the sleeve to diameter X. As clearly shown in Fig. 8, the spacer 54 also extends into a slot formed in the mandrel and will thus serve not only as a fixed spacer in the slot of the sleeve, but will also serve as a directioning member preventing any possible shifting of the sleeve on the mandrel during turning of the outside diameter. With the sleeve firmly gripped on the mandrel the outside diameter is turned to a dimension Y exactly equal to the bore of the valve body. During this turning operation the groove system, unless previously formed, may be formed in the sleeve. Following final turning of the sleeve and completion of the lubricant system, the holes 34 will be drilled in the sleeve and the sleeve slipped over the plug, after which the pins 35 and 36 may be inserted and the valve placed in the plug by squeezing the sleeve so as to decrease the width of slot 24, thereby permitting assembly of a plug member having a turned diameter equal to the diameter of the body bore.

As an example of the preceding, the bore diameter may be turned to 2.50 inches and the outside sleeve diameter also to 2.50, that is, to the same dimension Y. The inside diameter of the sleeve may be turned, for example, to 2.00 and in case a one-sixteenth inch slot is used, then the portion 10 will be turned to slightly under 1.98. Closing of the one-sixteenth inch slot, either by squeezing or by pressure exerted by pins 35 and 36 during turning, will provide a clearance of roughly two one-hundredths between the sleeve and bore, thus allowing ready turning.

While the valve and its method of manufacture have been described more or less in detail it will be obvious that certain modifications and changes in structure and method may be made other than those shown and described and without departing from the scope of the invention as defined by the following claims.

What is claimed is:

1. In a valve the combination of a valve body having a passageway therethrough for the flow of matter, a bore formed in the body and having its axis angularly disposed relative to the axis of said passageway and its walls finished to provide a seating surface having a predetermined diameter, means at least partially closing the ends of said bore, a plug member rotatably mounted with respect to said means and bore and having side walls spaced a substantial distance from said bore seating surface, a sleeve member of substantially uniform wall thickness mounted in said space and having an external diameter substantially equal to the diameter of the bore seating surface and an internal diameter slightly greater than the diameter of the plug member portion located in the bore, said sleeve member having a slot cut therethrough whereby the same may flex, enlarged openings formed in said sleeve on either side of said slot, and outwardly converging pins projecting from said plug member and freely movable within said enlarged openings, said pins having a cross-sectional area substantially less than the cross-sectional area of said enlarged openings.

2. In a valve the combination of a valve body having a passageway therethrough for the flow of matter, a bore formed in the body and having its axis angularly disposed relative to the axis of said passageway and its walls finished to provide a seating surface having a predetermined diameter, means at least partially closing the ends of said bore, a plug member rotatably mounted with respect to said means and bore and having side walls spaced a substantial distance from said bore seating surface, a sleeve member mounted in said space and having an external diameter substantially equal to the diameter of the bore seating surface and an internal diameter slightly greater than the diameter of the plug member portion located in the bore, said sleeve member having a slot cut therethrough whereby the sleeve may flex, enlarged openings formed in said sleeve on either side of said slot, and outwardly converging pins projecting from said plug member and slidably received in said enlarged openings, said pins being normally located on the slot side of said enlarged openings and causing a radial movement of portions of the sleeve during initial movement of the valve.

3. In a valve the combination of a valve body having a passageway therethrough for the flow of matter, a bore formed in the body and having its axis angularly disposed relative to the axis of said passageway and its walls finished to provide a seating surface having a predetermined diameter, means at least partially closing the ends of said bore, a plug member rotatably mounted with respect to said means and bore and having side walls spaced a substantial distance from said bore seating surface, a sleeve member mounted in said space and having an external diameter substantially equal to the diameter of the bore seating surface and an internal diameter slightly greater than the diameter of the plug member portion located in the bore, said sleeve member having a slot cut therethrough whereby the sleeve may flex, angularly disposed enlarged openings formed in said sleeve on either side of said slot and having the walls adjacent the slot converging outwardly toward the plane of the slot, and outwardly converging pins projecting from said plug member into said enlarged openings in substantial parallelism with said walls and shiftable with respect thereto.

GEORGE R. ERICSON.

References Cited in the file of this patent

UNITED STATES PATENTS

| Number | Name | Date |
|---|---|---|
| Re. 21,113 | Sproull | June 13, 1939 |
| 1,705,643 | Okochi | Mar. 19, 1929 |
| 1,743,116 | Cook | Jan. 14, 1930 |
| 1,926,026 | Beyer | Sept. 12, 1933 |
| 1,926,450 | MacGregor | Sept. 12, 1933 |
| 1,939,141 | Schultes | Dec. 12, 1933 |
| 2,270,548 | Olson | Jan. 20, 1942 |
| 2,346,052 | Seamark | Apr. 4, 1944 |
| 2,414,966 | Melichar | Jan. 28, 1947 |
| 2,461,041 | Donaldson | Feb. 8, 1949 |

FOREIGN PATENTS

| Number | Country | Date |
|---|---|---|
| 840,412 | France | of 1939 |